United States Patent [19]

Lowther

[11] 4,238,925
[45] Dec. 16, 1980

[54] GAS TURBINE SYSTEM WITH OXYGEN VAPOR-FUEL SYSTEM

[75] Inventor: Frank E. Lowther, Buffalo, N.Y.

[73] Assignee: Purification Sciences Inc., Geneva, N.Y.

[21] Appl. No.: 941,298

[22] Filed: Sep. 11, 1978

Related U.S. Application Data

[63] Continuation-in-part of Ser. No. 879,969, Feb. 21, 1978, abandoned, and Ser. No. 889,851, Mar. 24, 1978, and Ser. No. 890,456, Mar. 27, 1978, Pat. No. 4,169,017.

[51] Int. Cl.$^3$ ............................................. F02C 3/20
[52] U.S. Cl. ........................... 60/39.46 R; 60/39.51 R
[58] Field of Search ............... 60/39.46 R, 39.51 R, 60/39.52, 39.71

[56] References Cited

U.S. PATENT DOCUMENTS

| | | | |
|---|---|---|---|
| 2,715,395 | 8/1955 | Finvold | 123/119 A |
| 3,501,913 | 3/1970 | Brille | 60/39.15 |
| 3,696,795 | 10/1972 | Smith et al. | 123/1 A |
| 3,709,203 | 1/1973 | Cettin et al. | 123/119 A |
| 3,736,745 | 6/1973 | Karig | 60/39.52 |
| 3,775,976 | 12/1973 | Karig | 60/39.33 |
| 3,844,113 | 10/1974 | Lookwood | 60/39.52 |
| 3,861,367 | 1/1975 | Kelmar | 123/119 A |
| 3,977,365 | 8/1976 | Vierling et al. | 123/3 |
| 4,041,699 | 8/1977 | Schelp | 60/39.51 R |

Primary Examiner—Louis J. Casaregola

[57] ABSTRACT

Oxygen vapor at elevated pressures is utilized as the oxidant component of an oxidant-fuel mixture in a fuel burning system for generating combustion gases which are then mixed with ambient gas and exhaust gases for driving a turbine wheel of a gas turbine operating in a burn-cool cycle. The oxygen vapor is provided from liquid oxygen which preferably is vaporized by heat exchange with hot exhaust gases from the turbine. The burn-cool system of turbine operation permits the oxygen vapors to be supplied to the burner of a combustion chamber at high inlet pressures of about 1500 psia, in contrast ot prior art systems which provide low pressure oxygen to a chamber for combustion in automobile or turbine engines.

23 Claims, 6 Drawing Figures

GAS TURBINE SYSTEM WITH OXYGEN VAPOR-FUEL SYSTEM

CROSS-REFERENCE TO RELATED APPLICATIONS

This application is a continuation-in-part of applicant's copending applications: (1) Ser. No. 879,969, filed Feb. 21, 1978 and now abandoned, entitled "Gas Turbine System"; (2) Ser. No. 889,851, filed Mar. 24, 1978, entitled "Gas Turbine System"; and (3) Ser. No. 890,456, filed Mar. 27, 1978 now U.S. Pat. No. 4,169,017, entitled "Gas Turbine System".

TECHNICAL FIELD

This invention relates to gas turbines and in particular to a Brayton cycle gas turbine.

BACKGROUND OF THE PRIOR ART

In the well-known gas turbines of the compressor-combustor type, the turbine blades are remote from the combustor and large additional quantities of compressed air are fed to a secondary zone of the combustion chamber to combine with the hot, expanding combustion gases, prior to such gases reaching the turbine blades, to reduce the gas temperature to a value that will not cause damage to the turbine blades, see for example, *Gas Turbine Power*, Second Edition, 1958, G. M. Dusinberre and J. C. Lester; *The Gas Turbine Engine*, 1975, Jan P. Norbye; *Automotive Gas Turbines*, Second Edition, 1969, Bill Carroll; and *Gas Turbine Engineering Handbook*, First Edition, 1966, John W. Sawyer.

Applicant's related patent application Ser. No. 879,969, filed Feb. 21, 1978, which is incorporated by reference herein in its entirety, discloses and describes a Lowther Gas Turbine which comprises a gas turbine method and apparatus using an intermittent burn operating cycle referred to as a burn-cool cycle, comprising a burn phase followed by a cool phase. This cycle includes: (1) feeding fuel to the burn chamber and burning it during the burn phase of the cycle, whereby the temperature of the chamber and turbine rises during the burn phase, and (2) cutting off most or all of the flow of fuel to the burn chamber during the cool phase whereby the temperature of the chamber and turbine falls. The air-to-fuel ratio during the burn phase is always the same, providing a high combustion temperature and high efficiency. The part-load efficiency loss problem of the prior art is eliminated by the related invention. In the prior art, under part-load, the air-to-fuel ratio was increased, thus resulting in a reduced burning temperature and reduced efficiency. The combustion temperature is much higher than the temperature that the structure is allowed to reach because of the intermittent burn cycle and the cool down phase, thus eliminating the need for high temperature materials. In addition, lower amounts of a source of oxygen, such as air, are needed as compared to the prior art gas turbine. For example, the Lowther Gas Turbine of the related invention uses about six times smaller volume of gas than does the well-known Chrysler automobile gas turbine.

The Lowther Gas Turbine also includes means for preventing the shaft speed from decreasing during the cool phase. This is accomplished by a flywheel action using, for example, a mechanical flywheel, an electric flywheel or a chemical flywheel. The related invention also includes the controlling of the length of at least one of the burn and cool phases to control the power output of the turbine. For example, if it is desired to increase power, the length of the burn phase can be increased, or the length of the cool phase can be decreased or both.

The Lowther Gas Turbine of the related invention also involves the use of different amounts and pressures of air during the cool phase than are used during the burn phase. Another aspect of that invention is the use of water injection during the cool phase to improve cooling. The water can be recovered in a condensor and recycled.

Yet another aspect of the Lowther Gas Turbine includes the use of two different fuels, one, for example, can be used in the burn phase and the other in the cool phase. In another embodiment of that invention the shaft is connected to an electric generator and to a traction motor. A gear box, electric generator and battery can also be used in various combinations along with water injection. In addition, a heat exchanger can be used to pre-heat the compressed gas prior to its being fed into the combustion chamber.

The related invention also includes embodiments employing a free turbine. Combined cycle embodiments of the related invention include the use of a second working fluid operating with either an open or closed cycle and with a second working fluid operating to drive a turbine.

Also, the Lowther Gas Turbine includes embodiments using plural turbines and plural burn chambers in which the intermittent cycle is employed in each burn chamber. There is a staggered burn cycle from one burn chamber to the next which, in the preferred embodiment, is a uniform staggered burn cycle. A preferred air-to-fuel ratio is in the range of 14.7:1 to 35:1. A preferred burn phase to cool phase is 90% to 10% in length of time of the respective phases.

An example of the intermittent burn-cool cycle of the Lowther Gas Turbine also is disclosed in applicant's related copending patent application Ser. No. 889,851, filed Mar. 24, 1978, wherein the rate of cooling of the turbine blades is enhanced by spraying fuel oil directly on the convex surface of the blades thereby shortening the cooling period. Ser. No. 889,851 is incorporated herein by reference in its entirety.

FIG. 17 of the above-identified patent application Ser. No. 879,969, shows an example of a chemical flywheel. According to the invention disclosed in that patent application, a cryogenic material, such as dry ice, liquid air, or liquid oxygen is vaporized and passed through the gas turbine system during the cooling period. The cryogenic material there serves two purposes: it expands and drives the turbine 12, of said FIG. 17, and it cools all the exposed parts that were heated during the burn phase of the burn-cool cycle described in that patent application.

U.S. Pat. No. 3,775,976, issued Dec. 4, 1973, describes the use of oxygen derived from a cryogenic source as an oxidant for a turbine engine in a thermal power system operated at near atmospheric pressures for a submersible. The patent describes methods and means for operation of the power system in either a closed or an open-circuit mode. Some features of the methods and means for operation of the turbine as described in the patent generally can be utilized in combination with applicant's Lowther Gas Turbine and with embodiments of applicant's present invention, as will be understood by those skilled in the art.

BRIEF SUMMARY OF THE INVENTION

It is an object of the present invention to provide a less expensive, less complex and more compact gas turbine.

It is another object of the present invention to utilize oxygen vapor at elevated pressures as the oxidant component of an oxidant-fuel mixture in a fuel burning system for generating combustion gases for driving a turbine wheel of a gas turbine, particularly a Lowther Gas Turbine operating in a positive displacement Brayton cycle in a burn-cool cycle. The oxygen can be provided in the form of liquid oxygen which then can be vaporized, preferably by heat-exchange with hot exhaust gases from the gas turbine in a known way. The oxygen can also be provided in gaseous form as a compressed gas in cylinders, also by means of an on-board air separation plant. The oxygen vapor or gas is provided to a burner of a combustion chamber at high inlet pressures, e.g., 1500 psia, in contrast to prior art systems which provide low pressure oxygen vapor or gas to a chamber for combustion in automobile or turbine engines.

BRIEF DESCRIPTION OF THE DRAWINGS

The present invention will be more fully understood by reference to the following detailed description thereof, when read in conjunction with the attached drawings, wherein like reference numerals refer to like elements and wherein.

DETAILED DESCRIPTION OF THE INVENTION

Figure 1:
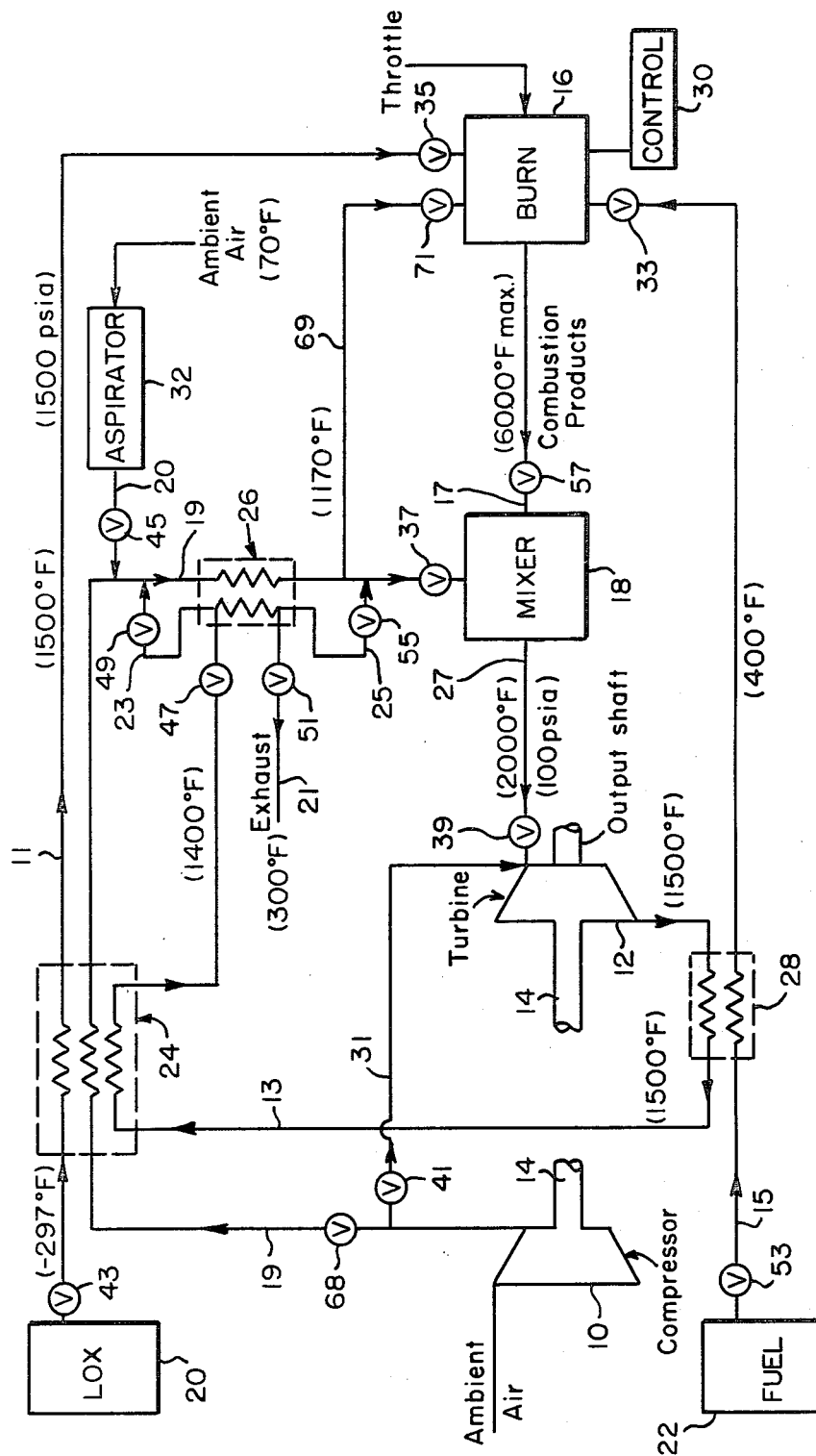
FIG. 1 is a schematic drawing of a Lowther Gas Turbine thermal power system modified according to the present invention.

With reference now to the drawings, FIG. 1 shows one embodiment of the present invention. The schematic symbols used in FIG. 1 are used throughout this specification and will be clearly understood by those skilled in the gas turbine field.

Reference numerals 10 and 12 represent the compressor and turbine, respectively, and any well-known type of compressors and turbines can be used. A cryogenic storage vessel 20 provides liquid oxygen (LOX) through outlet 43 and line 11 connected to a heat exchanger 24 where the LOX is vaporized and heated to about 1500° F. (815° C.) and a pressure of 1500 psia by means of heat primarily provided by hot gases flowing from the outlet of the turbine 12 through line 13 which also is connected to heat exchanger 28. The oxygen vapor or gas flows through line 11, e.g. at 0.2 lb./min. to a combustion chamber 16, which is provided with control means 30, an oxygen vapor inlet 35, a fuel vapor inlet 33 and a throttle. A storage tank 22 provides a fluid fuel, preferably a hydrocarbon such as gasoline or kerosene, e.g. at 0.1 lb./min., through line 15. Line 15 is connected to a heat exchanger 28 whereby the liquid fuel is vaporized and heated to about 400° F. (204° C.) by means of the hot gases flowing from the outlet of turbine 12 through line 13 which also is connected to heat-exchanger 28.

The oxygen vapor from line 11 and the fuel vapor from line 15 are mixed and burned in combustion chamber 16 to form gaseous combustion products having temperatures as high as about 6000° F. (3320° C.). The gaseous combustion products flow through line 17 to a mixer 18.

The mixer 18 is provided with an inlet 37 for heated air which flows to the mixer 18 through line 19. The heated air for line 19 preferably is provided from the atmosphere at about 70° F., 14.7 psia through aspirator 32, e.g. at 15 lbs./min. (corresponding to 50 h.p. output). The air flows through line 27 into line 19 which is connected to heat exchanger 26, where the air is heated to 1170° F. (632° C.) by heat-exchange with the hot turbine outlet gases flowing through line 13. The heated air then enters the mixer 18.

Heated air can also be provided to mixer 18 by means of ambient air which is compressed by compressor 10 into line 19. Line 19 is connected to heat-exchanger 24 where the air is partially heated by the hot exhaust gases flowing through line 13. The partially heated air can be combined with ambient air from line 29 and aspirator 32 prior to entering heat-exchanger 26; or line 29 and aspirator 32 can be shut off from line 19 and only the compressed air from compressor 10 used in mixer 18. The use of compressed air will be advantageous when the aspirator cannot adequately supply a large enough flow of air for mixing with the combustion products and exhaust in mixer 18.

Line 13 is provided with a first branch line 23 whereby all or part of the hot gases from line 13 can be flowed directly into line 19 and mixed with the air in line 19 before the air reaches heat exchanger 26. Line 13 is provided also with a second branch line 25 whereby all or part of the hot turbine outlet gases in line 13 can be flowed into the heated air in line 19 after it leaves heat-exchanger 26. Line 13 is further provided with an exhaust line 21 whereby exhaust gas can be exhausted from the gas turbine through lines 13 and 21. The above combination of lines 13 and 19, with or without branch lines 23 and 25, provides means whereby the gas turbine can be operated most efficiently by recapturing as much as possible of the heat capacity of the hot gases flowing from the gas turbine 12. The branch lines 23 and 25 provide means whereby air alone, gases from the turbine 12, or any mixture of the air with such gases can be flowed into the mixer 18 for mixing with the combustion products from the combustion chamber 16 and directing the resulting mixture of gases to turbine 12 through line 27 at a temperature of about 2000° F. (1093° C.) and 100 psia.

The control means 30 associated with combustion chamber 16 mixes the oxygen vapor and the fuel vapor (and any other ingredient which may beneficially be added) and programs the burn/cool cycle, and also provides control of the feeding of the combustion products through line 17 into the mixer 18, and the feeding of the air and/or exhaust gases from line 19 into the mixer 18 for mixing with the combustion products, and controls the flow of the resulting mixture from mixer 18 to turbine 12, as will be well understood by those skilled in this art and therefore no detailed description thereof is necessary or desired. The control means 30 preferably contains a microprocessor.

In FIG. 1 of the drawing, unless otherwise identified, items 33, 35, 37, 39, 41, 43, 45, 47, 49, 51, 53, 55, and 57 are valves for controlling flows of the gases as will be clear to one skilled in the art. Also, in FIG. 1, compressor 10 provides ambient air through line 31 to turbine 12 to cool the structure during the cool phase of the burn-cool cycle, substantially as described in patent application Ser. No. 879,969.

In some aspects of operation of the turbine, it will be advantageous to mix ambient air with the vaporized oxidant to provide an increased volume of combustion product gases. While this will reduce combustion efficiency somewhat, it will result in an increase in horsepower of the engine. For such purpose, heated ambient air from line 19 of FIG. 1 can be fed to burner 16 through line 69 and valve 71. This procedure is also useful to keep the turbine in operation when the supply of liquid oxygen needs to be replenished without closing down the turbine. The heated ambient air is then burned with the fuel in burner 16 until flow of oxygen vapor is resumed.

The oxidant and fuel vapors in burner 16 will preferably be burned in about stoichiometric amounts. In the case of kerosene and oxygen, such a stoichiometric amount is 1 part of kerosene to about 2 parts of oxygen by weight depending on the purity of the oxygen. The gaseous combustion products are mixed in mixer 18 with 28 parts by weight of air to obtain an optimum gas to fuel ratio 30:1, which is preferred. The gas to fuel ratio can range from 15:1 to about 100:1 for practice of the present invention.

The term "gas" as used in the term "gas to fuel ratio" is intended to include air and its mixtures with the combustion products and exhaust gases entering turbine 12. The term "fuel" is intended to mean the hydrocarbon burned in the burner 16. The ratio accordingly is a ratio between the mixed gases going to the turbine to the hydrocarbon material burned in the burner 16, by weight.

The fuel burned with the oxidant vapors to form gaseous combustion products can be any liquid or liquified hydrocarbon, including liquid natural gas, gasolines, kerosene and fuel oils. Fluidized coals also may be found useful in some aspects of practice of the invention. The term hydrocarbon is also intended to include oxygen containing derivative compounds such as alcohols, ketones and ethers. The term fuel oils includes diesel fuels, pentane and butane.

A simple, open cycle system is shown in FIG. 1. Typical flow rates and temperatures that are shown correspond to about 50 h.p. shaft outputs. Higher or lower horsepowers will have higher or lower flow rates accordingly. The temperatures are invariant with power.

The mixer 18 must admit a large volume of low pressure air and a low volume of high pressure oxygen and deliver a high volume of mixed low pressure gases (air, oxygen, and combustion products of oil that has been burned, e.g. $CO_2$, water vapor, etc.) that must drive the turbine. An important advantage of the present invention is the fact that heat from the exhaust gases in heat exchangers 24, 26, and 28 feeds into low temperatures ($-297°$ F. for the oxygen, and 70° F. for the fuel and diluent air) and thus most of the heat energy in the exhaust gases is recovered. In contrast, in a conventional system the exhaust gases pass into the compressor outlet which is near 700° F.

Figure 2:
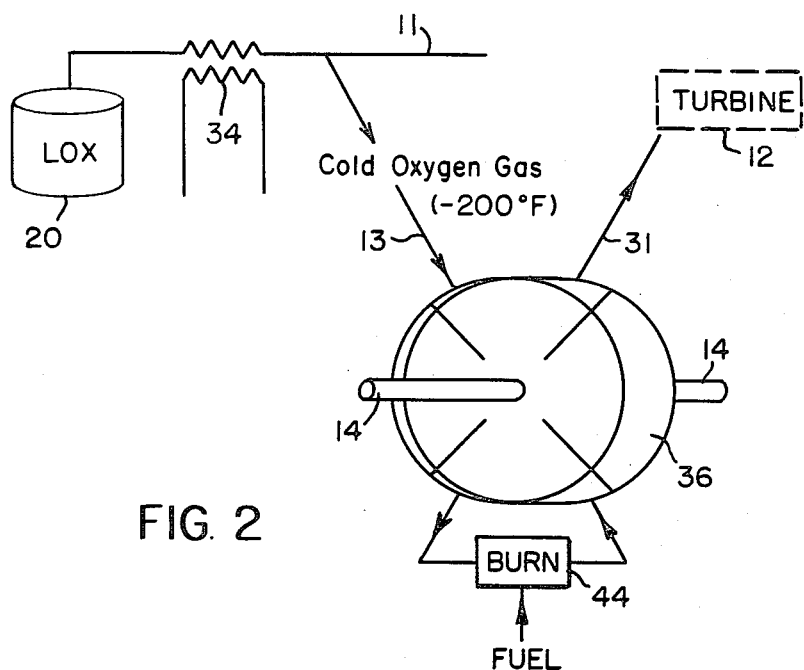
FIG. 2 is a schematic drawing of a modification of the embodiment of FIG. 1.

FIG. 2 shows an embodiment of the invention whereby the coldness from the liquid oxygen is used only for critical functions. Shown in FIG. 2 is a typical rotary vane device 36 serving two functions, one of which is not compression-expansion, and hence power takes place from both functions. In one function, gaseous oxygen after vaporization from LOX in storage vessel 10 in a liquid vaporizer 34 but before being heated, enters blades, or vanes, at a nominal $-200°$ F. through line 33, expands against the vanes, and does an amount of work. The pressure on the oxygen side of the rotary device 36 can be set at any reasonable value, e.g. 60 psia, that best utilizes the pressure energy available. For example, starting torque can be supplied by the cold oxygen prior to the start of burn. In the other function, the oxygen leaves the rotor cavities of the vanes of device 36 and enters a burner 44. The hot combustion products from the burner re-enter the rotovanes on the other side of device 36, expand and supply torque to the shaft. The exhaust gases may have residual pressure (shown this way in FIG. 2) and pass along to a second motor, for example, to mixer 18 and to turbine 12 of FIG. 1. One main advantage of the embodiment of FIG. 2 is that the cold oxygen supplies cooling to the hot turbine vanes of device 36 as they leave the hot gas side. Relative volumes are not such that the cold side of the blades is very cold and the hot side of the blades is very hot. The $-200°$ F. gas will almost instantaneously become hot. The main objective of using the cold oxygen gas as described in this embodiment is to reduce the average temperature on the vanes in accordance with the principle of the Lowther Gas Turbine method of operation. Device 36 can be provided on the same shaft 14 as is turbine 12. The device permits the turbine to be run solely with oxygen gas for short periods when fuel runs out.

Figure 3:
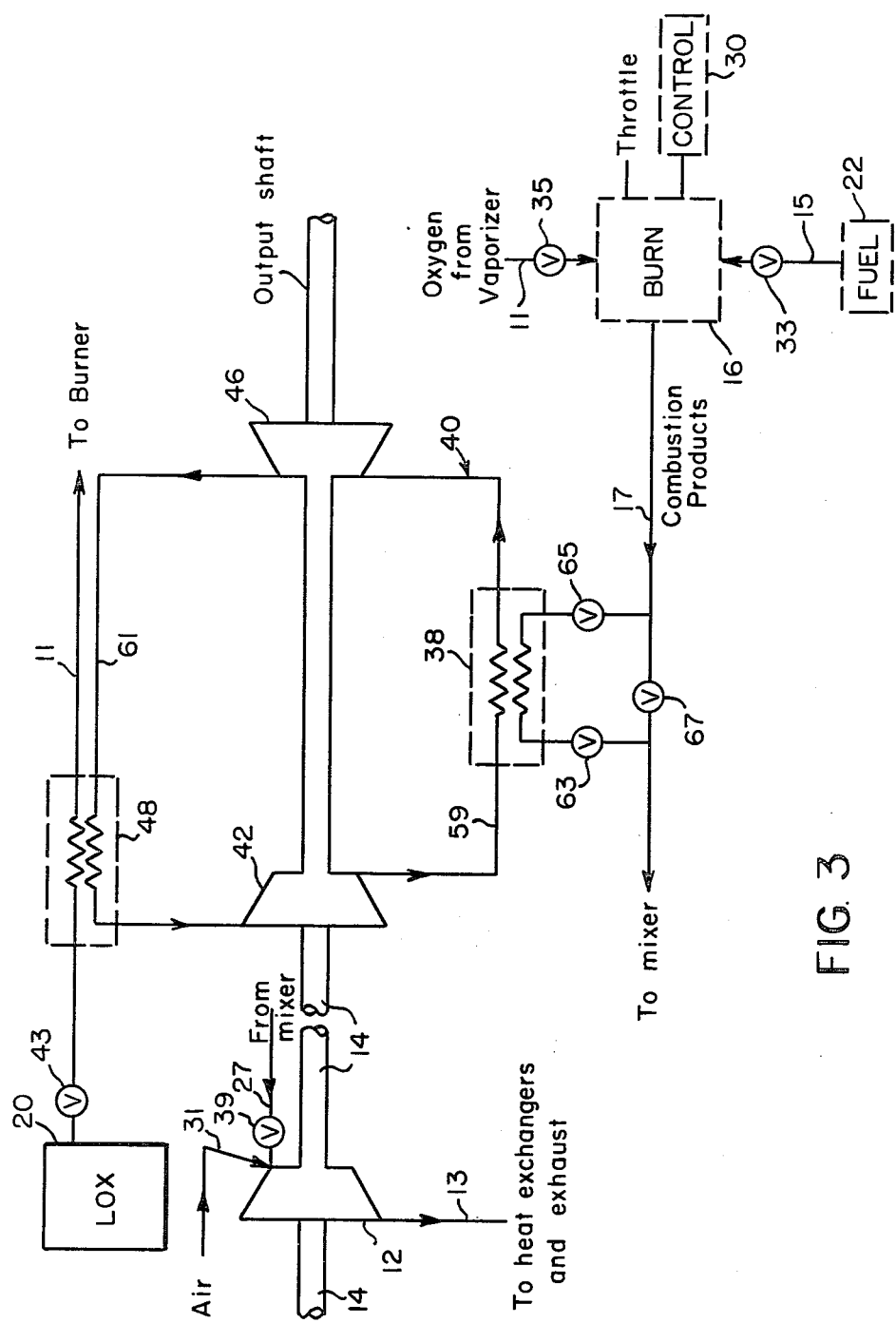
FIG. 3 is a schematic drawing of another modification of the embodiment of FIG. 1.

FIG. 3 shows a simple closed system which can be incorporated with the embodiment of FIG. 1 preferably between the burner 16 and turbine 12 on a shaft 14. A heat exchanger 38 transfers heat energy in combustion gases from the burner 16 to a working fluid, e.g. a liquifiable gas, such as ammonia or a halogenated hydrocarbon, Freon 12, circulating in the closed system 40. The combustion gases are formed by heating vapor from liquid oxygen from storage vessel 20 and burning fuel from vessel 22 in the burner 16 with the heated oxygen vapor. The combustion gases provide heat to heat-exchanger 38, which in turn, provides heat to vaporize compressed liquified gas in line 59 of the closed system 40. The vaporized gas then expands to drive turbine 46 and compressor 42. Compressor 10 recompresses and condenses the circulating gas from line 61 for re-expansion in a known way. Heat-exchanger 48 serves to transfer heat from the expanded gas in closed system 40 to the oxygen vapor in line 11. Preferably, the rotary devices in the system are rotary vanes or other positive displacement devices.

Although use of stored liquid oxygen for automotive internal combustion engines has been proposed, for example, in U.S. Pat. No. 3,861,367, issued Jan. 21, 1975, such use in an automotive gas turbine service presents safety problems of storage and usage that must be overcome. Also, the overall economics governing gas turbine service clearly favor an air-feed system combined with combustion products of an oxygen feed system over an oxygen feed system for driving a turbine.

As used herein the term air feed is intended to mean a combustion system wherein air provides the oxygen for burning as the oxidant with the fuel component, which usually is a hydrocarbon material, such as kerosene. The term oxygen-feed system is intended to mean a combustion system which uses elemental oxygen or its equivalent as the oxidant for burning with the fuel component.

The positive displacement Brayton cycle concept is sufficiently new and different to deserve a re-examination of the oxygen feed system. In order to be justified, oxygen feed must supply major improvements in at least several areas:

1. A significant reduction in fuel required per horsepower-hour delivered must be achieved.
2. A significant reduction in the bothersome $NO_x$ exhaust pollutants must be realized.
3. A simpler engine must result that is cheaper to build and simpler to maintain.

There are certain things that oxygen feed can accomplish in engine performance and certain things it cannot. The combustor design problem is very much simplified by the use of oxygen. Standard air is only 20% oxygen and therefore the combustor must handle about five times the gas volume with air feed as with oxygen feed. This is particularly important in a Brayton type engine due to the large volumes of gas that must be handled. For a practical sized combustor, gas velocities with air feed can approach several hundred feet/second through the combustor, which gives rise to stability and flameout problems. In contrast, oxygen-feed cuts this velocity by a factor of 5, and a relative gentle combustion process results. The Brayton cycle (turbine, positive displacement, etc.) depends upon gas mass flow to develop power. In fact, the shaft horsepower depends directly upon gas temperature, pressure ratio, and mass flow rate. A later analysis shows that air (secondary) must be introduced into the combustion stream in order to satisfy the horsepower requirement. This is not true, however, for a closed cycle system. In that case, the power handling capacity is determined by the closed gas system and is substantially divorced from the combustion system except for the heat transfer mechanism. In short, the power delivery section (closed system) does not depend on the mass flow rate through the combustor.

An advantage of the use of oxygen in place of air in a Brayton cycle combustion process is that little or no $NO_x$ will be formed in the combustion zone if pure oxygen is used. Also, when diluent air is fed into the hot combustion products gas stream, there appears to be very little possibility for formation of $NO_x$ if the mixing is done properly. The very stable $N_2$ bond must be broken to form $NO_x$, and such a process requires high temperature and free ion activity that exists in a flame or plasma. The Lowther Gas Turbine utilizing oxygen and a diluent amount of air can be operated at a low level of $NO_x$ formation, thereby making possible attainment of Environmental Protection Agency standards by means of the present invention.

The questions of safety can be resolved with known engineering and safety practices. The two major problems are accident safety and prevention of loading oxygen into the fuel tank and vice-versa. For example, a "bomb" case for a Dewar type liquid oxygen tank can be used as it has been used successfully in many other areas, such as commercial airline flight recorder protection from crashes, and in the case design for high reliability electrolytic capacitors. Extension of standard gas industry practices will take care of the loading hazard questions.

A supply of oxygen for use in practice of the invention is practically unlimited, since oxygen supply technology and capability exists now. The fuel usage in the United States of America for automobiles and trucks presently is about $1.5 \times 10^{11}$ pounds/year. At a 2:1 oxygen/fuel ratio this would require $3 \times 10^{11}$ pounds/year of oxygen. An expected efficiency improvement arising from practice of the present invention could reduce oxygen usage to about $10^{11}$ pounds/year of oxygen for the case of 100% changeover. The U.S.A. produced and used about $0.32 \times 10^{11}$ pounds of oxygen in 1977, or about ⅓ that to be expected from automobile demand. The gas industry could very easily "gear up" to the increased demands.

The use of oxygen according to the present invention with a positive displacement Brayton cycle using a Lowther Gas Turbine should save significant amounts of fuel. For example, thermal efficiencies can approach the 60–80% range, as opposed to the 20–40% range obtainable for present-day gasoline and Diesel engines. This improvement translates directly into better miles per gallon of liquid fuel. One of the strict requirements for automotive service is the limited weight and space available for fuel and oxidizer. For a fixed total automobile range, the increased efficiency promises to reduce the fuel tank requirements by a factor of from 3 to 4. The added volume and weight required for the oxygen and its Dewar case will increase the tankage requirements by an amount which about off-sets this gain. Thus, the tank storage volume and weight for an oxygen feed system remains about the same as in the prior art.

The oxygen storage problem is less severe for truck and automotive service. This fact alone could favor oxygen usage in these applications long before widespread usage in automobiles. Trucks already carry cryogenic nitrogen for atmospheric control and can be similarly equipped to handle a supply of cryogenic oxygen.

The amount of heat reduction (cooling) that stored oxygen can provide is limited and must be restricted to critical functions such as rotary vane cooling as described in said related patent application Ser. No. 879,969. The total heat balance can be summarized as follows:

Heat content, 1 pound typical fuel (e.g., kerosene) = 20,000 Btu

Exhaust heat content per lb. fuel (70% Eff.) = 6,000 Btu

Heat required to raise 1 pound fuel to flash point = 634 Btu

Heat required to vaporize 2 pounds LOX and raise to 2000° F. = 1194 Btu

Figure 4:
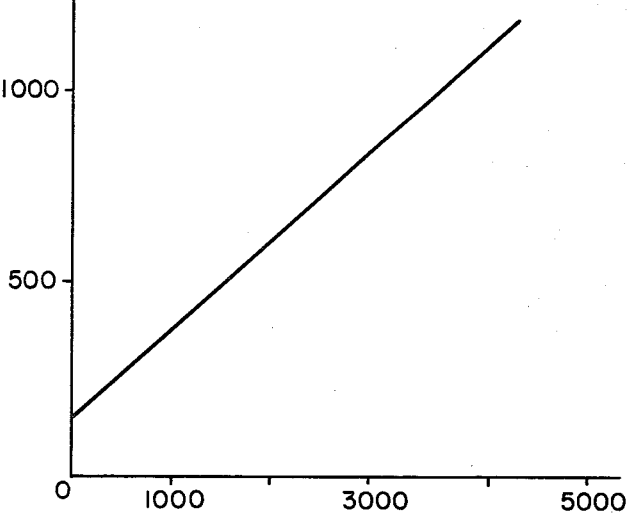
FIG. 4 is a chart showing available cooling from a pound of liquid oxygen as a function of the final oxygen temperature.

Thus, the combined cooling effect of the cryogenic oxygen and liquid fuel is only about 30% of the exhaust heat content. FIG. 4 presents the available cooling from a pound of liquid oxygen as a function of the final oxygen gas temperature.

Figure 5:
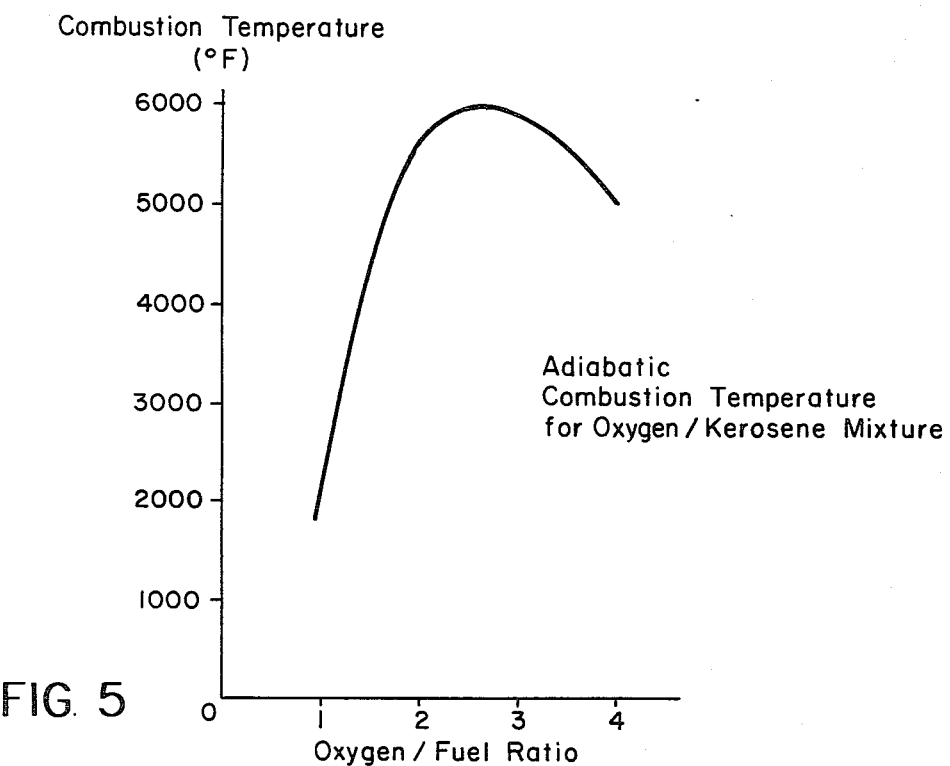
FIG. 5 is a chart showing adiabatic flame temperature, °F., as a function of the oxygen/fuel ratio.

It is possible to cut down, somewhat, the oxygen requirements by burning lean. This is illustrated in FIG. 5 which shows adiabatic flame temperature °F. vs. oxygen/fuel ratio. Any deviation from the ideal point (2.38:1), of course, will cost efficiency via the reduction in primary flame temperature. One other point of economics should also be observed. Fuel (oil) presently costs about 10 cents/pound (60 cents/gallon) and can be expected to go up in the future. Liquid oxygen in massive amounts presently costs 1-2 cents/pound and may even go down as more coal is mined and used for central station power generation. It follows that the unusual space limitation in the automobile is the only reason for considering the inefficient burning (FIG. 5) and then only if such a scheme does indeed save total space. Indeed, water (essentially free) could not be used in automobile service even if it cut fuel requirements in half, since about 10-50 gallons of water may be required per gallon of fuel and such amount of space is not practically available in an automobile.

In some aspects of the present invention, the use of liquid oxygen eliminates the need for a compressor in the Brayton type engine, for example, as described above in relation to the embodiment of FIG. 3.

Liquid oxygen boils at −297° F. As the vapor is heated to room temperature and above, pressures of several thousand psi will result. This excess pressure can be used to compress (via aspiration, etc.) any dilutant air that may be required prior to expansion of the gas mixture from the mixer in the output motor of the Lowther Gas Turbine. It should be pointed out that power in any expansion device (turbine, rotary vane, etc.) reaches a limiting value at about a pressure ratio of 50:1. Thus, a gas pressure of 750 psi (50 atmospheres) will produce almost as much work as a gas at 2,000 psi (for equal gas mass flow rates). In other words, combustion product gases at 2,000 psig could be diluted with ambient air at 0 psig and the net result would be, say, 200 psig depending upon the amount of dilution. The amount of dilution that is in fact required for practice of the present invention can be calculated as follows:

For a gas specific heat constant pressure of 0.25 Btu/pound °F., one may write the formulas:

$$P_T = 5.9 \times 10^{-3} \left( \dot{W}_f + \dot{W}_{02} + \dot{W}_{air} \right) T_3 \eta_T \left( 1 - \frac{1}{x} \right) \qquad 1.$$

$P_T$=Power Developed By Expansion Motor (h.p.)
$T_3$=Gas Inlet Temperature To Motor (°F., Abs.)
$\eta_T$=Adiabatic Thermal Efficiency Of Expansion
$\dot{W}_f$=Fuel Mass Flow Rate (16/min.)
$\dot{W}_{02}$=Oxygen Mass Flow Rate (16/min.)
$\dot{W}_{air}$=Mass Flow Rate of Diluent Air (16/min.)
$x = (p_1/p_2)a - 1/a$
$p_1/p_2$=Pressure Ratio
$a$=Ratio of Specific Heats Also, the fuel mass flow rate can be related to output power and overall thermal efficiency, thus:

$$\dot{W}_f = P_T/500\eta T \qquad \text{(for a typical fuel)} \qquad 2.$$

With a 2:1 oxygen/fuel ratio, we have:

$$\dot{W}_{02} + \dot{W}_f = (3/500)(P_T/\eta T) \qquad 3.$$

Equations 1 and 3 combine to give:

$$\dot{W}_{air} = \frac{P_T}{167\eta T} \left\{ \frac{2.83 \times 10^4}{T_3 \left( 1 - \frac{1}{x} \right)} - 1 \right\} \qquad 4.$$

$$(\text{SCFM})_{air} = 0.080 \, \frac{P_T}{\eta T} \left( \frac{2.83 \times 10^4}{T_3 \left( 1 - \frac{1}{x} \right)} - 1 \right) \qquad 5.$$

Figure 6:
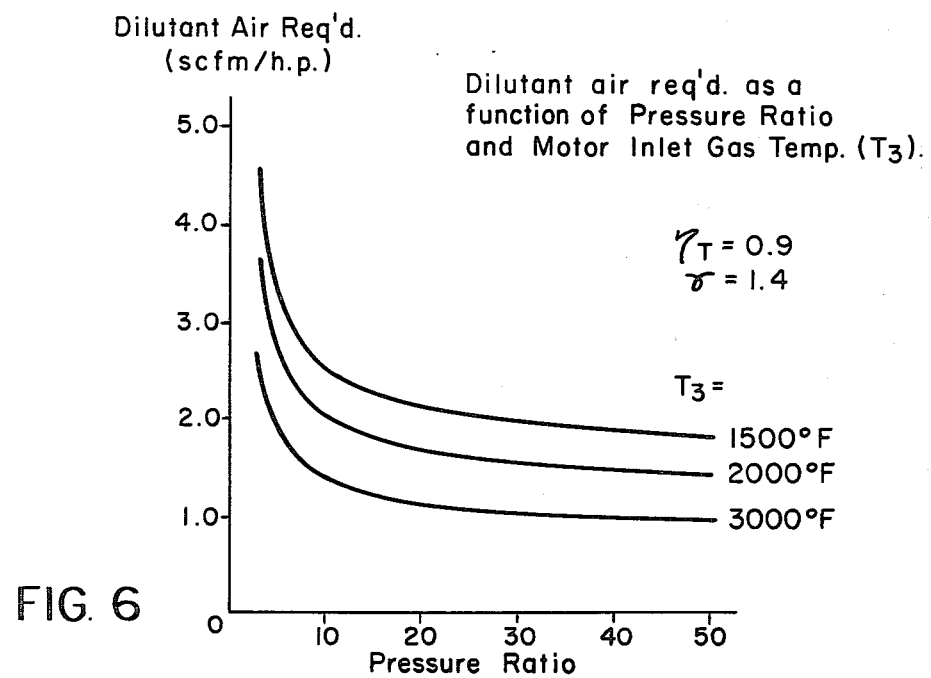
FIG. 6 is a chart showing dilutant air required as a function of pressure ratio and motor inlet gas temperatures.

The only assumptions made to derive equations 4, 5 was a 2:1 oxygen to fuel mass ratio. Equation 4 is plotted in FIG. 6 as a function of pressure ratio and motor inlet temperature ($T_3$). Notice that very little improvement is seen in the diluent requirements at pressure ratios above 30:1. A quick comparison to the air feed case can be made. Calculations have shown that air flow rates of about 250 SCFM were required to deliver 50 h.p. at the shaft. Consider FIG. 6 for the typical case of 2000° F. and a 40:1 pressure ratio. The diluent air required is read to be about 1.1 SCFM/h.p. Thus, 55 SCFM is required to deliver 50 h.p. In summary, the use of oxygen reduced the air required from 250 to 55 SCFM. The total volumetric flow rate for the oxygen and fuel accordingly is small in comparison to an air-feed system.

One advantage of the closed cycle system of FIG. 3 is that no dilutant air is required. In such embodiment, a compressor, such as compressor 10 will be preferably used in a closed cycle system of operation.

At this point it will be helpful for further understanding of the advance in the turbine operating art made by the present invention to describe how the invention is advantageous and beneficial in operating a gas turbine having a combustion chamber and a turbine wheel including a plurality of turbine blades and adapted for operation in an intermittent burn-cool cycle, particularly in a Brayton cycle.

The objective in each embodiment hereof is to increase the overall efficiency of a Lowther Gas Turbine in operation preferably in a Brayton cycle, in an intermittent burn-cool cycle. In one aspect, cold oxygen vapor enhances cooling of the turbine blades while also providing torque to the turbine wheel. In another aspect, cryogenic oxygen serves to recover heat from the exhaust gases from the combustion gases which drive the turbine. In a third aspect, the use of oxygen in place of air in the burner 16 minimizes formation of $NO_x$ at the high combustion temperatures utilized in the Lowther Gas Turbine. In a fourth aspect, heated ambient air is mixed with combustion products of an oxygen feed system to provide an optimum amount of gases for driving a turbine.

Generally, all of the embodiments of the present invention can be operated in either the normal continuous burn mode or in the intermittent burn-cool cycle of the Lowther Gas Turbine as described in the related copending patent application Ser. No. 879,969 of applicant, and in applicant's related copending patent application Ser. No. 890,465, filed Mar. 27, 1978 and entitled "Gas Turbine System", both incorporated herein in their entireties.

The disclosure in applicant's said copending application Ser. No. 879,969, relates to a typical intermittent burn-cool cycle which comprises a burn phase (such as of 5 minutes) followed by a cool phase (such as of 30 seconds). During the burn phase, fuel is burned in a conventional manner, providing combustion gases at an extremely high temperature which impinge upon the turbine blades and heat them while driving them to operate the turbine wheel. Then, during the cool phase, fuel flow is cut off (or substantially reduced) during which time the turbine blades are permitted or are induced to cool down. Cool compressed ambient air usually is permitted to flow through the gas turbine during the "cool" period, thereby inducing a rapid reduction in the temperature of the critical structural members, including the "buckets" of the turbine blades. The burn-cool cycle thus prevents the buckets from becoming overheated and from deteriorating under the combined effects of heat and centrifugal forces.

The disclosure in applicant's said copending application Ser. No. 890,465 relates to a gas turbine method and apparatus in which the air-to-fuel ratio in the primary combustion zone is directly controlled, and is in one embodiment maintained substantially constant at the preferred ratio, even as the fuel rate varies. In another embodiment, the burn temperature in the primary combustion zone is maintained substantially constant even as the fuel rate varies. The air-to-fuel ratio can be changed for different conditions such as ambient temperature, type of fuel and type of driving (high speed or stop and go). In another embodiment, the quantity of air fed to the secondary zone for cooling the turbine is controlled independently of the fuel rate and air rate to the primary combustion zone. The gas turbine can be operated in either a continuous burn mode or with an intermittent burn operation cycle comprising a burn phase followed by a cool phase. In the intermittent cycle, changing throttle demand can be satisfied by changing any one or more of: the fuel rate, length of the burn phase, or length of the cool phase, along with varying the amount of secondary air for cooling the turbine.

It is an important aspect of the Lowther Gas Turbine to provide a high inlet gas temperature for turbine fuel efficiency purposes while operating the structure, particularly the turbine buckets at a much lower average structural temperature than that of the inlet gas.

The invention has been described in detail with particular reference to the preferred embodiments thereof, but it will be understood that variations and modifications can be affected within the spirit and scope of the invention as described hereinafter and as defined in the appended claims.

I claim:

1. In a gas turbine comprising a compressor, a first turbine connected by a shaft to said compressor, an output shaft connected to said turbine, a throttle, a burn chamber, a duct from the burn chamber to the turbine, means for feeding ambient air from said compressor to said turbine, a tank for liquid fuel, means for feeding fuel from said tank to said burn chamber, control means for generating an intermittent burn-cool operating cycle comprising a burn phase followed by a cool phase, means for storing a cryogenic oxidant, means for vaporizing said cryogenic oxidant and feeding the vaporized oxidant to said burn chamber, means for feeding said fuel to said burn chamber, and means for burning said fuel and vaporized oxidant in the entirety of said burn chamber during said burn phase whereby gases fed from said burn chamber to said turbine during said burn phase include hot combustion product gases, the improvement including:
   means for vaporizing said liquid fuel;
   a mixer located intermediate said burn chamber and an inlet to said turbine for mixing said hot combustion product gases with dilutant gases, said dilutant gases including heated air,
   means for feeding ambient air to a heating means and means for feeding the heated air to said mixer;
   means for feeding exhaust gases from said turbine to said mixer; and
   means for exhausting exhaust gases to the atmosphere.

2. The gas turbine according to claim 1 wherein said means for vaporizing said liquid fuel is a heat exchanger located intermediate said tank and said burn chamber whereby heat from the hot exhaust gases from said turbine are used to vaporize said liquid fuel.

3. The gas turbine according to claim 1 wherein said means for vaporizing said cryogenic oxidant is a heat exchanger located intermediate said means for storing said cryogenic oxidant and said burn chamber whereby heat from the hot exhaust gases from said turbine are used to vaporize said liquid oxidant.

4. The gas turbine according to claim 1 wherein said means for feeding ambient air to a heating means and means for feeding the heated air to said mixer is said compressor.

5. The gas turbine according to claim 1 wherein said means for feeding ambient air to a heating means and means for feeding the heated air to said mixer is an aspirator.

6. The gas turbine according to claim 4 wherein said means for heating said ambient air includes at least one heat exchanger located intermediate said compressor and said mixer whereby heat from the hot exhaust gases from said turbine are used to heat said air.

7. The gas turbine according to claim 5 wherein said means for heating said ambient air includes at least one heat exchanger located intermediate said aspirator and said mixer whereby heat from the hot exhaust gases from said turbine are used to heat said air.

8. The gas turbine according to claim 1 including means for feeding hot exhaust gases into the means for feeding the heated air to said mixer.

9. The gas turbine according to claim 1 wherein said cryogenic oxidant is liquid oxygen.

10. The gas turbine according to claim 1 including a second turbine connected to said output shaft of said first turbine, a liquified gas in closed circuit fluid driving communication with said second turbine for driving said second turbine, said liquified gas being in heat exchange relationship by a heat exchanger with the hot exhaust gases from said first turbine for gasifying said gas and being in heat exchange relationship with a heat exchanger and to cold from said cryogenic oxidant for condensing said gas.

11. The gas turbine according to claim 10 wherein said liquified gas is one of the group consisting of water, ammonia, freon, and learium.

12. The gas turbine according to claim 1 including means for operating said gas turbine in a substantially constant pressure Brayton cycle.

13. A Brayton cycle engine comprising:
   (a) a positive displacement compressor having a gas inlet and a gas outlet;
   (b) a combustion chamber including an inlet and an outlet and means for burning a fuel therein;
   (c) an output turbine having a gas inlet and a gas outlet and being connected to said compressor by a shaft;
   (d) means for feeding an oxygen containing as to said compressor inlet, means for feeding compressed gas from said compressor outlet to said combustion chamber inlet; means for feeding hot compressed gas from said combustion chamber outlet to said output wheel inlet, and means for feeding exhaust gas out of said output wheel outlet;

(e) means for operating said engine in a substantially constant pressure Brayton cycle, (f) a tank for liquid fuel, (g) means for vaporizing said liquid fuel;

(h) means for feeding fuel from said tank to said combustion chamber, (i) control means for generating an intermittent burn-cool operating cycle comprising a burn phase followed by a cool phase;

(j) means for storing a cryogenic oxidant, (k) means for vaporizing said cryogenic oxidant and feeding the vaporized oxidant to said combustion chamber, (l) means for feeding said fuel to said combustion chamber;

(m) means for burning said fuel and vaporized oxidant in the entirety of said combustion chamber during said burn phase whereby gases fed from said combustion chamber to said turbine during said burn phase include hot combustion product gases;

(n) a mixer located intermediate said burn chamber and an inlet to said turbine for mixing said hot combustion product gases with dilutant gases, said dilutant gases including heated air;

(o) means for feeding ambient air to a heating means and means for feeding the heated air to said mixer;

(p) means for feeding exhaust gases from said turbine to said mixer; and (q) means for exhausting exhaust gases to the atmosphere.

14. The engine according to claim 13 wherein said means for vaporizing said liquid fuel is a heat exchanger located intermediate said tank and said burn chamber whereby heat from the hot exhaust gases from said turbine are used to vaporize said liquid fuel.

15. The engine according to claim 13 wherein said means for vaporizing said cryogenic oxidant is a heat exchanger located intermediate said means for storing said cryogenic oxidant and said burn chamber whereby heat from the hot exhaust gases from said turbine are used to vaporize said liquid oxidant.

16. The engine according to claim 13 wherein said means for feeding ambient air to a heating means and means for feeding the heated air to said mixer is said compressor.

17. The engine according to claim 13 wherein said means for feeding ambient air to a heating means and means for feeding the heated air to said mixer is an aspirator.

18. The engine according to claim 16 wherein said means for heating said ambient air includes at least one heat exchanger located intermediate said compressor and said mixer whereby heat from the hot exhaust gases from said turbine are used to heat said air.

19. The engine according to claim 17 wherein said means for heating said ambient air includes at least one heat exchanger located intermediate said aspirator and said mixer whereby heat from the hot exhaust gases from said turbine are used to heat said air.

20. The engine according to claim 13 including means for feeding hot exhaust gases into the means for feeding the heated air to said mixer.

21. The engine according to claim 13 wherein said cryogenic oxidant is liquid oxygen.

22. The engine according to claim 13 including a second turbine connected to said output shaft of said first turbine, a liquified gas in closed circuit fluid driving communication with said second turbine for driving said second turbine, said liquified gas being in heat exchange relationship by a heat exchanger with the hot exhaust gases from said first turbine for gasifying said gas and being in heat exchange relationship with a heat exchanger and to cold from said cryogenic oxidant for condensing said gas.

23. The engine according to claim 10 wherein said liquified gas is one of the group consisting of water, ammonia, freon, and learium.

* * * * *